(12) United States Patent
Furukawa et al.

(10) Patent No.: US 6,256,278 B1
(45) Date of Patent: Jul. 3, 2001

(54) DISC DRIVE EQUIPPED WITH A DISC TRAY HAVING A DISC CLAMPER DISPLACEMENT MEANS

(75) Inventors: Ken'ichi Furukawa, Kawasaki; Kouji Teranishi, Atsugi; Satoru Manabe, Chofu, all of (JP)

(73) Assignee: Mitsumi Electric Company, Tokyo (JP)

( * ) Notice: Subject to any disclaimer, the term of this patent is extended or adjusted under 35 U.S.C. 154(b) by 0 days.

(21) Appl. No.: 09/052,315

(22) Filed: Mar. 31, 1998

(30) Foreign Application Priority Data

Apr. 1, 1997 (JP) .................................................. 9-098212

(51) Int. Cl.$^7$ .................................................. G11B 33/02
(52) U.S. Cl. ............................................................ 369/77.1
(58) Field of Search ................................. 369/75.1, 75.2, 369/77.1, 77.2

(56) References Cited

U.S. PATENT DOCUMENTS

| | | | |
|---|---|---|---|
| 4,627,037 | * 12/1986 | Tamaru et al. ....................... | 369/77.2 |
| 4,697,259 | 9/1987 | Takanashi ........................... | 369/75.2 |
| 4,829,501 | 5/1989 | Seto et al. .......................... | 369/75.2 |
| 5,218,592 | * 6/1993 | Isshiki et al. ....................... | 369/75.2 |
| 5,237,555 | 8/1993 | Tsuruta et al. ...................... | 369/77.2 |
| 5,473,585 | * 12/1995 | Kim ..................................... | 369/36 |
| 5,586,106 | 12/1996 | Chiou et al. ......................... | 369/270 |
| 5,751,687 | * 5/1998 | Ariyoshi et al. ..................... | 369/202 |

FOREIGN PATENT DOCUMENTS 0 128629A    12/1984   (EP) .

* cited by examiner

*Primary Examiner*—Brian E. Miller
*Assistant Examiner*—Kenneth W Fields
(74) *Attorney, Agent, or Firm*—Patents + TMS

(57) ABSTRACT

A disc drive comprises a main body equipped with a turntable for rotating a disc, a disc tray movable with respect to the main body between a disc loaded position and a disc eject position to transport the disc to the disc loaded position, and a disc clamper for holding the disc transported by the disc tray between the turntable and the disc clamper. The disc drive further includes a disc clamper displacement mechanism provided on the disc tray to make contact with the disc clamper to displace the disc clamper upward when the disc tray is moved from the disc loaded position to the disc eject position so as to prevent obstruction of the movement of the disc tray. This mechanism includes an inclined surface formed on at least a portion of the disc tray to the rear of a disc supporting portion and a reinforcing portion connected to the rear of the inclined surface. According to this structure, the disc clamper does not obstruct the movement of the disc tray, and since a space created underneath the disc tray is utilized to provide ribs underneath the reinforcing portion and the inclined surface, which increase the strength of the disc tray and prevent cambering or warpage of the disc tray.

7 Claims, 15 Drawing Sheets

DISC DRIVE EQUIPPED WITH A DISC TRAY HAVING A DISC CLAMPER DISPLACEMENT MEANS

BACKGROUND OF THE INVENTION

1. Field of the Invention

The present invention relates to a disc drive equipped with a disc tray, and in particular relates to an improved disc tray for a disc drive that is used for playing back or recording and playing back an optical disc such as a CD-ROM or a CD-R or the like.

2. Description of the Prior Art

As shown in FIG. 1, a disc drive 1 for an optical disc, such as a CD-ROM drive or the like, is basically constructed from a main body 2 and a disc tray 5' which moves backwards and forwards (horizontally) with respect to the main body 2 for conveying an optical disc 3.

In this connection, FIGS. 13 and 14 are cross-sectional views showing a structure of a prior art disc drive in a simplified manner. As shown in these drawings, the main body 2 includes a circuit substrate assembly 12, a mechanism assembly 13 provided above the circuit substrate assembly 12, and a casing 10 which houses the circuit substrate assembly 12 and the machine assembly 13.

The casing 10 is constructed from thin metal plates and the like, with the front portion of the casing 10 being provided with a front panel 15 that includes an opening 15a, as shown in FIG. 1. The disc tray 5' is designed to be ejectable out of and insertable into the main body 2 via this opening 15a.

Further, as shown in FIGS. 13 and 14, the mechanism assembly 13 includes a chassis 40 and a mechanism unit 42 supported on the chassis 40. The rear portion of the mechanism unit 42 basically includes a base member 44 which is pivotally supported to the chassis 40 in order to enable the front portion of the mechanism unit 42 to be displaced between a raised position (upper position; see FIG. 13) and a lowered position (lower position; see FIG. 14) which is below the raised position. This base member 44 is provided with a spindle motor 45 for rotating an optical disc 3, a turntable 46 which is fixed to a rotation axle 45a of the spindle motor 45 for supporting the optical disc 3, an optical pick-up 47 (including an actuator) for playing back or recording and playing back the optical disc 3, and an optical pick-up moving mechanism (not shown in the drawing) for moving the optical pick-up 47 in the radial direction of the optical disc 3.

Arranged above the chassis 40, at a position which faces the turntable 46 when the base member 44 is displaced to the raised position, is a disc clamper 80 which is provided rotatably and movably in up and down. This disc clamper 80 is rotatably supported on a plate-shaped support member 81 having an aperture 81a formed in the center thereof.

The disc clamper 80 includes a flat-bottom, drum-shaped main body portion 80a which is inserted through the aperture 81a of the support member 81, and a flange portion 80b formed around the periphery of the upper portion of the main body portion 80a so as to be supported by the upper surface of the support member 81. Provided inside this main body portion 80 is an annular iron attraction member (not shown in the drawings) adapted to be attracted by a permanent magnet (not shown in the drawings) provided in the turntable 46.

As shown in FIG. 15, the disc tray 5' includes a shallow concave disc supporting portion 5a. The optical disc 3 is placed into the disc supporting portion 5a of the disc tray 5' with being positioned with respect to the disc tray 5', the optical disc 3 is conveyed from a disc loading/unloading position (disc eject position) to a disc loaded position (disc playback position).

Further, the disc tray 5' includes an opening 20, with the turntable 46 and the optical pick-up 47 being positioned below the opening 20 when the disc tray 5' is positioned at the disc loaded position.

In the disc drive described above, if the disc tray 5' on which the optical disc 3 is placed is moved from the disc loading/unloading position to the disc loaded position, then the base member 44 is moved from the lowered position (FIG. 14) to the raised position (FIG. 13). On the other hand, at the time of ejection, first the base member 44 is moved from the raised position (FIG. 13) to the lowered position (FIG. 14), and then the disc tray 5' is moved from the disc loaded position to the disc loading/unloading position.

As shown in FIG. 13, when the base member 44 is at the raised position, the turntable 46 is raised above the disc supporting portion 5a of the disc tray 5' through the opening 20 to hold up the disc 3 in a state that enables the disc 3 to be rotated, and in this state the disc clamper 80 is attracted to the magnet of the turntable 46, whereby the disc 3 is held therebetween. At this time, as shown in FIG. 13, the flange portion 80b of the disc clamper 80 is separated from the upper surface of the support member 81.

On the other hand, when the base member 44 is moved to the lowered position, as shown in FIG. 14, the turntable 46 is separated from the disc clamper 80 and the flange portion 80b of the disc clamper 80 is supported by the upper surface of the support member 81. In this state that the base member 44 has been moved to the lowered position, the lower end of the main body portion 80a of the disc clamper 80 partly protrudes into the concave portion which forms the disc supporting portion 5a of the disc tray 5'.

Consequently, in this prior art disc drive, in order to prevent the disc clamper 80 from obstructing the movement of the disc tray 5' when the disc tray 5' is moved from the disc loaded position to the disc loading/unloading position, a concave portion 21' for avoiding the disc clamper 80 is formed on a part of the disc tray 5' which passes a position where the lower end of the disc clamper 80 is being positioned when the disc tray 5' is moved, that is a part of the disc tray 5' which extends from the rear side of the opening 20 to the rear end of the disc tray 5'.

However, in a case where such a concave portion 21' is formed on the part of the disc tray 5', the part must be formed into a thin plate-like part made from a resin material, so that the strength of that part is relatively low in comparison with the opposite sides of that part (concaved portion 21'). In this regard, the opposite sides can be reinforced by forming reinforcement ribs on the back surfaces thereof to increase their strength, thereby preventing cambering (warpage) from being caused when hardening in cooling process. In contrast with this, it is not possible for the concave part 21' to provide such reinforcement ribs, that is it is simply formed from a thin plate-shaped resin material, there is a case that cambering is likely to be caused when hardening in cooling process. In the event that such a cambering is cased, the disc tray 5' is deformed, which results in a problem in that the deformed disc tray 5' can not be smoothly moved due to unfavorable contact with other parts.

Further, in order to avoid the disc clamper 80, there may be such approach that the length of the aperture of the disc tray is extended close to the rear end of the disc tray.

However, in this approach, because there is a restriction on the length of the disc tray due to the standardization of the entire length of the disc drive, the width of the remaining rear part of the disc tray 5' becomes extremely narrow, and this makes it impossible to provide the disc tray with sufficient strength.

SUMMARY OF THE INVENTION

The present invention has been made in view of the problem involved in the prior art disc drive. Accordingly, it is an object of the present invention is to provide a disc dirve equipped with a disc tray which has a sufficient strength so that cambering or warpage is difficult to be caused.

In order to achieve the object, a disc drive according to the present invention comprises:

a main body equipped with a turntable for supporting a disc, the turntable being rotatably driven by a motor;

a disc tray which includes a disc supporting portion for supporting the disc, the disc tray being provided so as to be movable with respect to the main body between a disc loaded position and a disc eject position;

a disc clamper for holding the disc transported to the disc loaded position by the disc tray between the turntable and the disc clamper, the disc clamper being provided so as to be rotatable and movable in the up and down direction with respect to the turntable in the main body; and a disc clamper displacement means provided on the disc tray to make contact with the disc clamper to displace the disc clamper upward when the disc tray is moved from the disc loaded position to the disc eject position so as to prevent obstruction of the movement of the disc tray.

According to the disc drive equipped with the disc tray having the above structure, when the disc tray is moved from the disc playback position to the disc eject position, the inclined surface of the disc clamper displacement means formed in the disc tray comes to contact the disc clamper to displace it upwardly, the disc clamper does not obstruct the movement of the disc tray.

Further, by providing the disc tray with the reinforcing portion and the inclined surface, a space is created underneath the disc tray, and such a space is utilized to provide ribs underneath the reinforcing portion and the inclined surface of the disc tray. Accordingly, by providing the ribs, it is possible to increase the strength of the disc tray and prevent cambering or warpage of the disc tray.

In the present invention, it is preferred that the turntable is constructed so as to be capable of displacement between a raised position in which the disc supported by the turntable is clamped between the turntable and the disc clamper, and a lowered position below the raised position in which the turntable is separated from the disc clamper.

Further, it is also preferred that the disc clamper displacement means includes an inclined surface formed at least a portion of the disc tray to the rear of the disc supporting portion to push up the disc clamper to displace the disc clamper in the upward direction when the disc tray is moved from the disc loaded position to the disc eject position.

Furthermore, it is also preferred that the disc clamper displacement means further includes a reinforcing portion connected to the rear of the inclined surface, whereby at least a portion of the upwardly displaced disc clamper runs along the top of the reinforcing portion when the disc tray moves to the disc loading/unloading position.

Moreover, it is also preferred to further include reinforcing ribs formed underneath the reinforcing portion or underneath the reinforcing portion and the inclined surface to reinforce the disc tray.

In these cases, it is particularly preferred that the disc clamper is supported by a support member provided above the turntable inside the main body.

Other objects, structures and advantages of the present invention will be apparent when the following description of the preferred embodiment will be considered taking in conjunction with the accompanying drawings.

BRIEF DESCRIPTION OF THE DRAWINGS

FIG. 12A to FIG. 12D respectively show the positional relationship between the disc tray and the disc clamper in the disc drive shown in FIG. 1, in which FIG. 12A shows the state that the disc tray is in the disc playback position, FIG. 12B and FIG. 12C show the states where the disc tray is being moved from the disc playback position to the disc eject position, and Fig .12D shows the state that the disc tray is in the disc eject position.

DETAILED DESCRIPTION OF THE PREFERRED EMBODIMENTS

A detailed description of the preferred embodiments of a disc drive equipped with a disc tray according to the present invention will now be given below with reference to the appended drawings.

Figure 1:
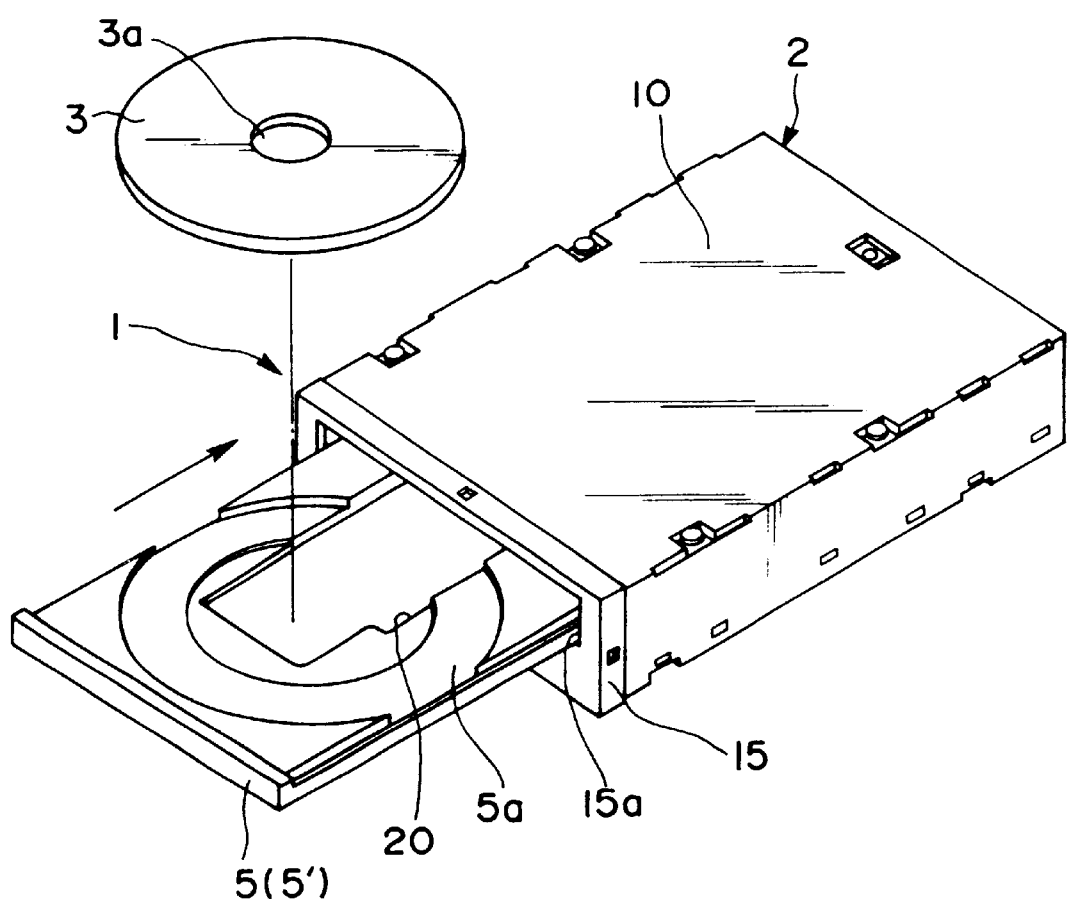
FIG. 1 is a perspective view which shows an external appearance of a disc drive to which a skew adjustment mechanism of the present application is applied.

FIG. 1 is a perspective view of a disc drive of an embodiment according to the present invention. The disc drive 1 shown in FIG. 1 is configured into a CD-ROM drive or a CD-R drive or the like for playing back or recording and playing back an optical disc 3. The disc drive 1 is roughly constructed from a main body 2 and a disc tray 5 which is movable in the forward and backward direction (horizontal direction) with respect to the main body 2 for transporting the optical disc 3.

The main body 2 include a circuit substrate assembly (not shown in the drawings) and a mechanism assembly 13 arranged on the circuit substrate assembly, and they are housed within a casing 10. The casing 10 is comprised of thin metal plates, and at the front portion of the casing 10, there is mounted a front panel 15 having an opening 15a.

Figure 2:
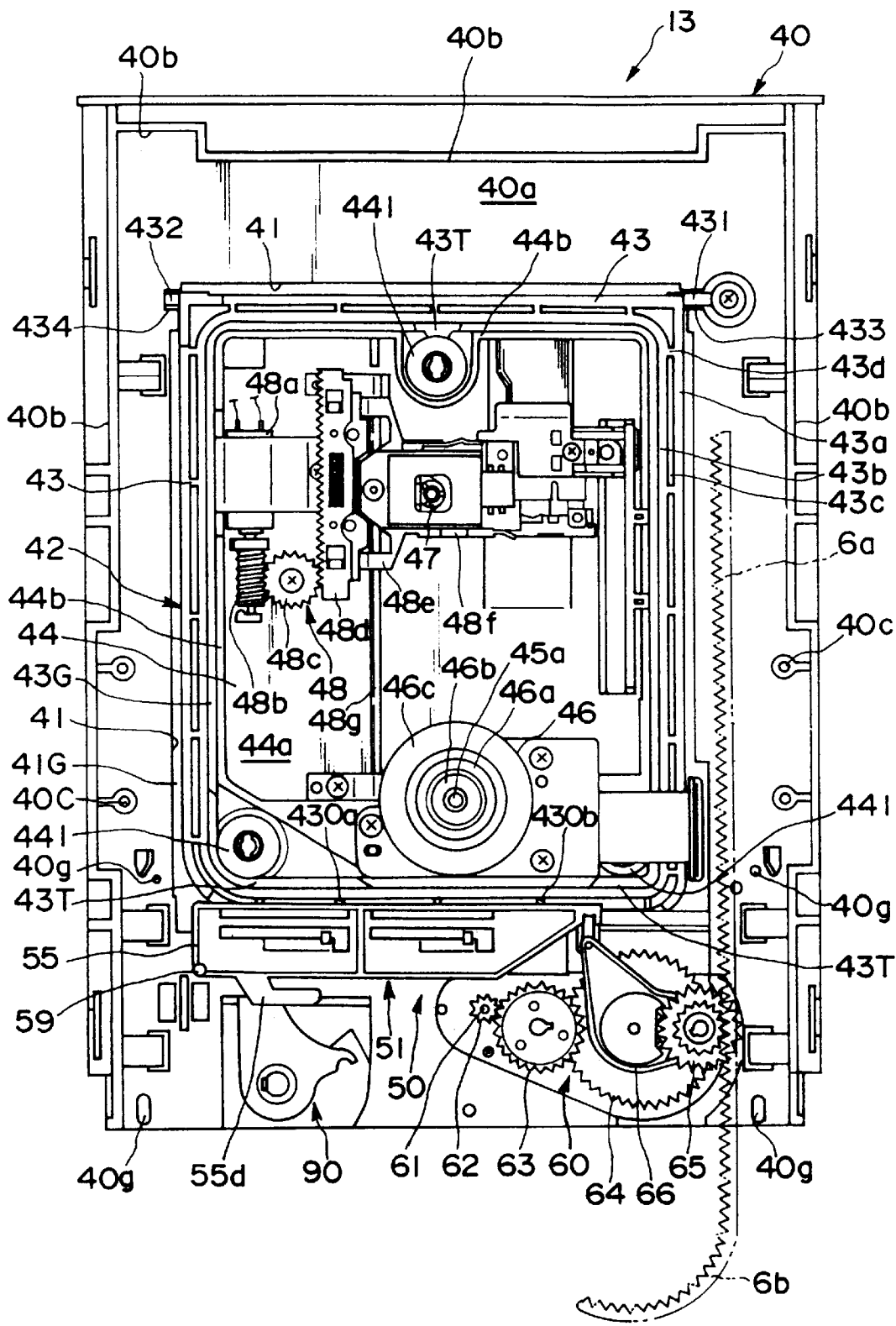
FIG. 2 is a planar view of a main body of the disc drive shown in FIG. 1, in which a mechanism unit is shown in a lowered position.
Figure 3:
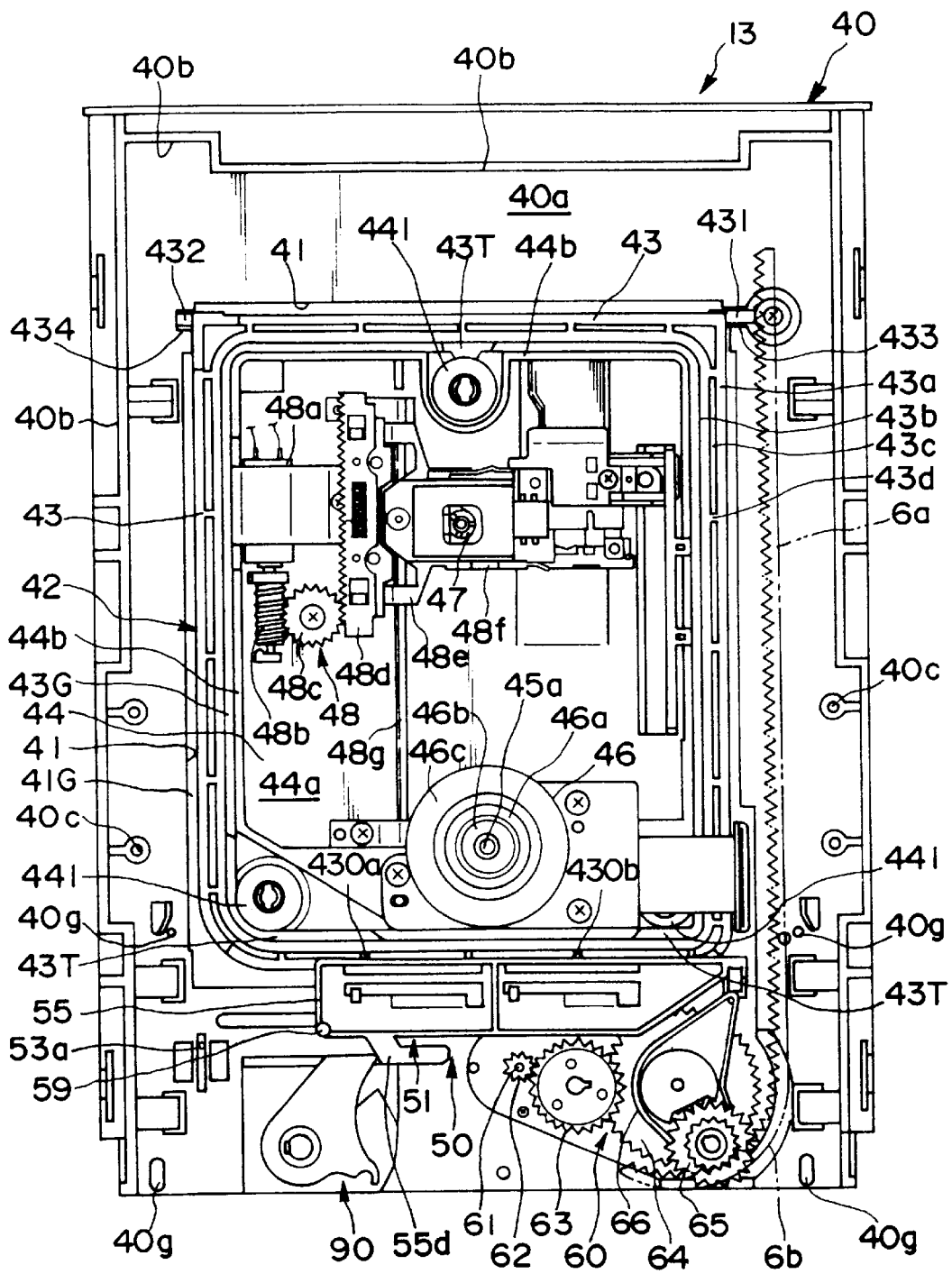
FIG. 3 is another planar view of the main body of the disc drive shown in FIG. 1, in which the mechanism unit is shown in a raised position.

FIG. 2 is a planar view of a main body 2 of the disc drive from which a casing is removed, which shows a state in which a mechanism unit is in a lowered position (lower position), and FIG. 3 is another planar view of the main body 2, which shows a state in which the mechanism unit 42 is in a raised position (upper position).

As shown in FIGS. 2 and 3, the mechanism assembly 13 housed in the casing 10 is provided with a chassis 40 which is preferably constructed from a hard resin. The chass is 40 is constructed from a roughly rectangular-shaped bottom portion 40a and a U-shaped wall portion 40b which stands erect along the left, right and back edge portions of the bottom portion 40a.

In this way, no wall portion is formed in the front of the chassis 40 such that the front of the chassis is open. Further, when the mechanism assembly 13 is assembled into the casing 10, the open front portion of the chassis 40 is aligned with the opening 15a of the front panel 15 attached to the casing 10 so that the disc tray 5 can be moved into and out of the main body 2 through the opening 15a.

Figure 4:
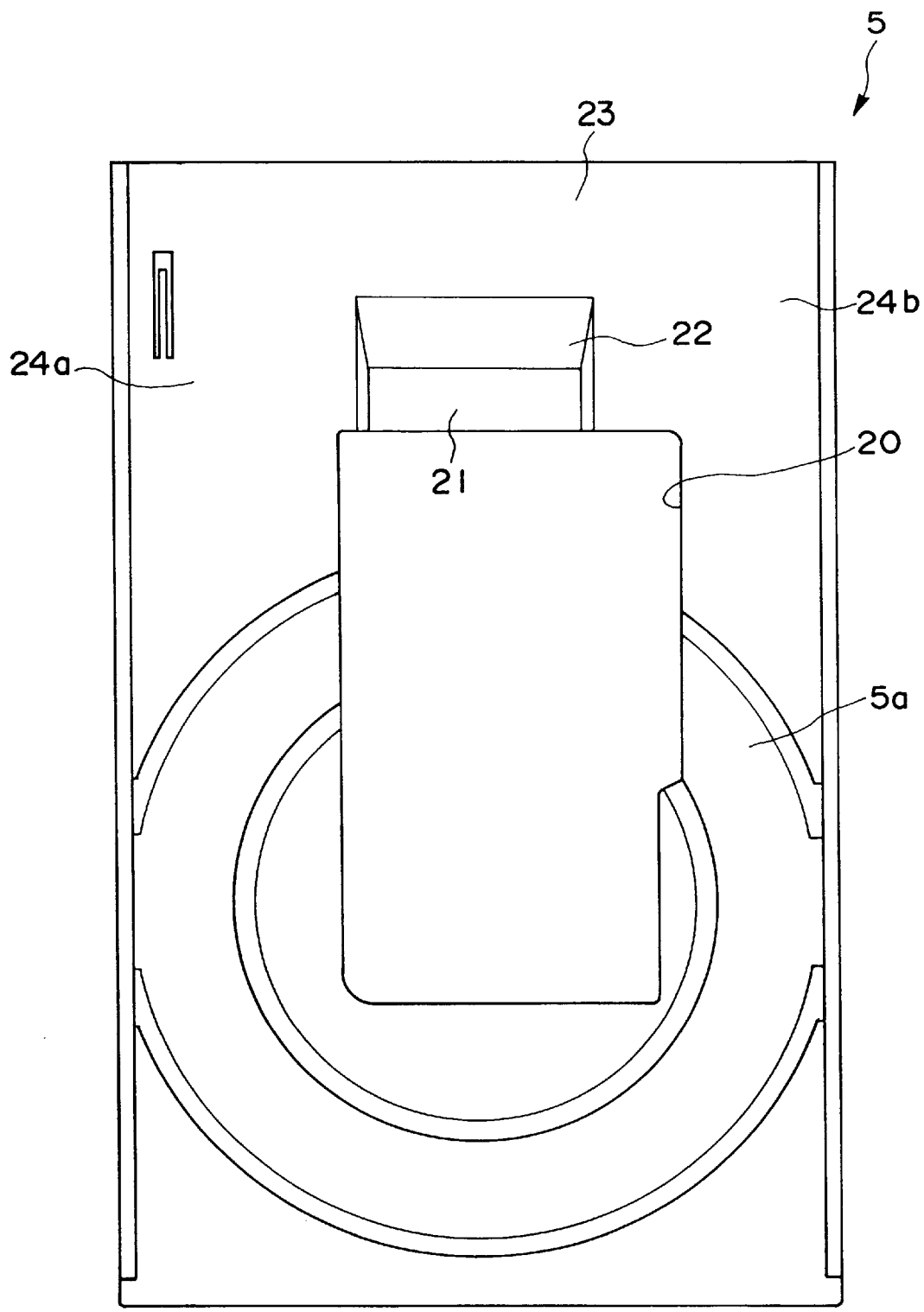
FIG. 4 is another planar view of the construction of the upper side of a disc tray of the disc drive shown in FIG. 1.

As shown in FIGS. 1 and 4, the disc tray 5 is provided with a shallow concave disc supporting portion 5a. The optical disc 3 is placed in the disc supporting portion 5a, and then transported to a disc loaded position (disc playback position) under the condition that the optical disc 3 is placed in a prescribed position.

Further, the disc tray 5 includes a roughly rectangular aperture 20 which is formed from roughly the center of the disc support portion 5a toward the rear thereof (upper side in FIG. 4). When the disc tray 5 is positioned at the disc playback position, the turntable 46 and the optical pick-up 47 are positioned below the opening 20 so that the opening 20 makes it possible for the optical pick-up 47 to move in a radial direction of the optical disc 3.

As shown in FIG. 4, this disc tray 5 further includes a concave portion 21 formed to the rear of the opening 20, an inclined surface 22 formed to the rear of the concave portion 21, and a reinforcement portion 23 formed to the rear of the inclined surface 22 at the rear end portion of the disc tray 5. As will be described later, when the disc tray 5 is moved from the disc playback position to the disc eject position, the inclined surface 22 pushes up the disc clamper 80 to displace it in the upwards direction, whereafter the disc clamper 80 runs over the top of the reinforcement portion 23. Namely, in this embodiment, the inclined surface 22 and the reinforcement portion 23 serve as a disc clamper displacement means of the present invention.

The concave portion 21 is set lower than horizontal portions 24a, 24b located on the both sides of the concave portion 21 to an extent that prevents the concave portion 21 from coming into contact with the disc clamper 80 when the disc tray 5 is moved from the playback position to the eject position. Further, in order to disturb the movement of the disc tray 5, the width of the concave portion 21 and the inclined surface 22 is set slightly larger than the diameter of the main body portion 80a of the disc clamper 80. The reinforcement portion 23 is formed so as to arrange its upper surface in the same plane as the upper surfaces of the horizontal portions 24a, 24b located on the both sides of the concave portion 21 and inclined surface 22.

Figure 5:
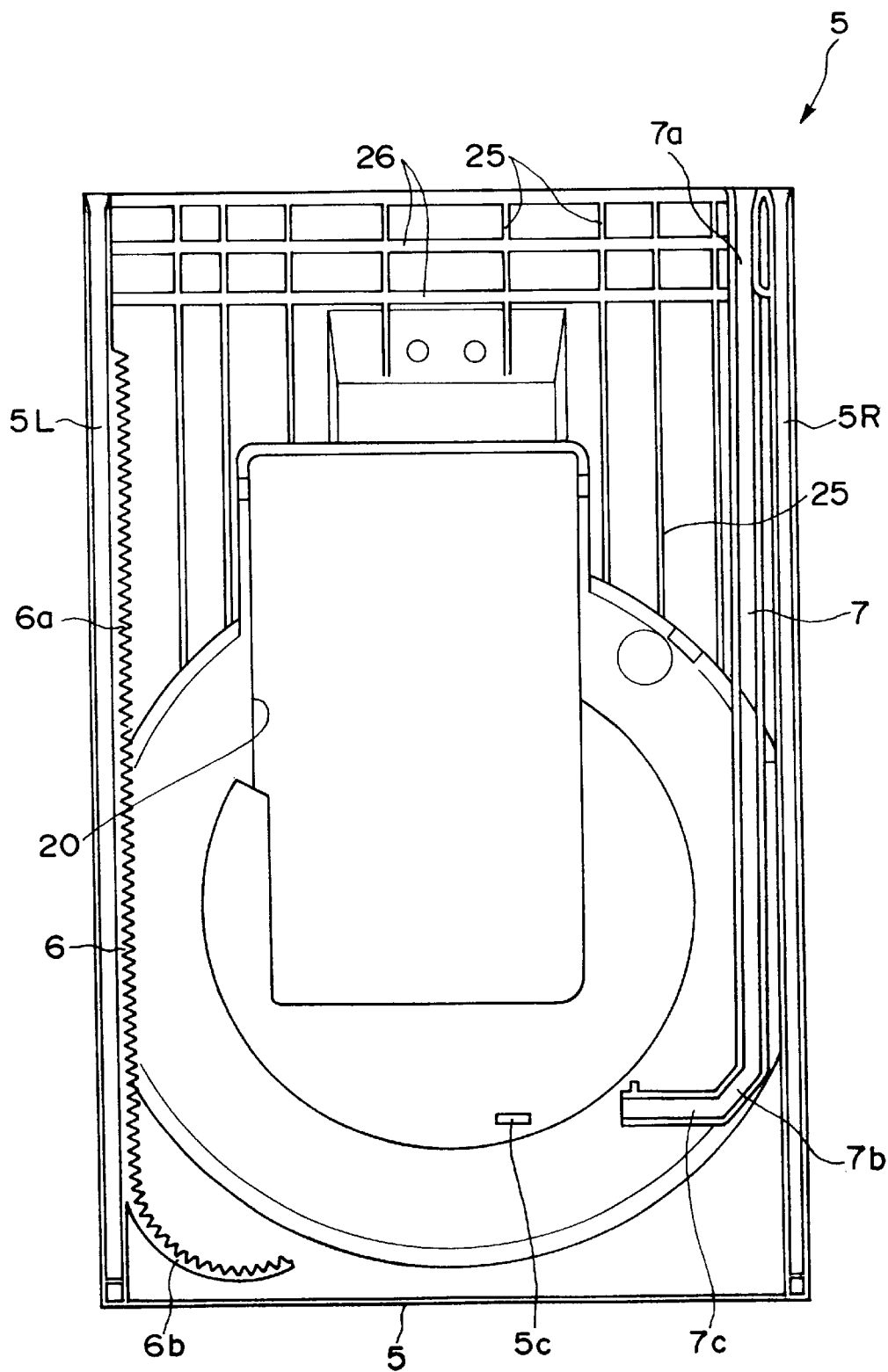
FIG. 5 is a bottom view of the construction of the underside of a disc tray of the disc drive shown in FIG. 1.

As shown in FIG. 5, longitudinal ribs 25 for reinforcing the disc tray 5 are formed on the underside surface of the rear portion of the disc tray 5, namely at the underside portions of the inclined surface 22, the reinforcement portion 23 and the horizontal portions 24a, 24b, and transverse ribs 26 are also formed on the underside portions of the reinforcement portion 23 and the horizontal portions 24a, 24b. Namely, by forming the transverse ribs 26 to run across the horizontal portion 24a, the reinforcement portion 23 and the horizontal portion 24b, the rear portion of the disc tray 5 is designed to increase the strength of the disc tray 5. Further, in order to prevent cambering or warpage from caused to produce deformation in the transverse direction of the rear portion of the disc tray 5 (i.e., the direction orthogonal to the moving direction of the disc tray 5), the width of the transverse ribs 26 are made wider than the longitudinal ribs 25 so as to increase the strength in the transverse direction.

On the left and right portions of the underside surface of the disc tray 5, there are formed guide grooves 5L, 5R so as to extend in a longitudinal direction (forward and backward direction) of the disc tray 5. These guide grooves 5L and 5R are adapted to slidably engage with protruding guide members 40g (see FIGS. 2 and 3) formed on the left and right side portions of the bottom portion 40a of the chassis 40.

Further, the underside surface of the disc tray 5 is further provided with a rack gear 6 which includes a first rack 6a which extends in a straight line in the forward and backward direction along the guide groove 5L and a roughly 90 degree arc-shaped second rack 6b which is formed at the front end portion (the front side of the disc tray 5, as shown in the lower portion of FIG. 5) of the first rack 6a so as to be continuous therewith.

Furthermore, as shown in FIG. 5, a cam member movement restricting groove 7 is provided on the underside surface of the disk tray 5 along the guide groove 5R which is positioned at the opposite side of the first rack 6a. This cam member movement restricting groove 7 is constructed from a first movement restricting groove 7a which extends parallel to the first rack 6a, a second movement restricting groove 7b which slants at a roughly 45 degree angle with respect to the first movement restricting groove 7a, and a third movement restricting groove 7c which slants at a roughly 45 degree angle with respect to the second movement restricting groove 7b. Accordingly, the third movement restricting groove 7c is arranged at a roughly 90 degree angle with respect to the first movement restricting groove 7a.

In this regard, it is to be noted that a rib (protrusion) indicated by the reference numeral 5c in the drawing is a member that is adapted to engage with a disc tray locking portion 55d formed in a cam member 55 (described below) for restricting the horizontal movement (forward and backward direction) of the disc tray 5.

Further, as shown in FIGS. 2 and 3, the chassis 40 is provided with a mechanism unit 42 equipped with a turntable 46 for rotating the optical disc 3 and an optical pick-up 47 for playing back or recording and playing back the disc 3 and others. The mechanism unit 42 is arranged inside a roughly rectangular-shaped opening 41 formed in the bottom portion 40a of the chassis 40, with the rear portion of the mechanism unit 42 being supported in a manner that makes it possible for such rear portion to pivot with respect to the chassis 40 in order to enable the front portion of the mechanism unit 42 to be displaced between a raised position (upper position; FIG. 3) in which the disc 3 is supported on the turntable 46 and a lowered position (lower position; FIG. 2) which is lower than the raised position.

In particular, as shown in FIGS. 2 and 3, the mechanism unit 42 includes a base frame 43 constructed preferably from a hard resin, and a support member (support plate) 44 which is supported on the base frame 43 via elastic members (insulators) 441.

The base frame 43 is formed so as to have a roughly rectangular shape which includes a front portion and a rear portion. In more detail, the base frame 43 comprises a substantially rectangular outer frame 43a and a substantially rectangular inner frame 43b arranged inside the outer frame 43a. The inner frame 43b is one size smaller than the outer frame 43a so as to define a space therearound and its corner portions are formed into an arched shape, respectively. Further, between the outer and inner frames 43a, 43b there is formed a horizontal connecting portion 43c which connects these frames integrally at a position roughly the middle of their height. Furthermore, a plurality of reinforcing vertical ribs are integrally formed on the connecting portion 43c through a predetermined spacing so as to connect the outer and inner frames 43a, 43b integrally. With this result, the base frame 43 is constructed into a so called rudder frame in which the reinforcing vertical ribs 43d are formed on the horizontal connecting portion 43c through a prescribed spacing around the inner frame 43b.

This base frame 43 is formed by injection molding. In this case, if the base frame 43 is formed from a usual mold body made of a hard resin and having a certain thickness, there is a case that deformation would occur when it is cooled after injection molding. However, if the base frame 43 is formed in the form of the rudder frame described above, it is possible to avoid such deformation from occurring and this means that it becomes possible to provide a light base frame having a high strength by injection. molding.

Formed on the left and right side portions of the rear side of the base frame 43 (the back portion of the main body 2) are protruding axles 431, 432 which act as pivotal axles to enable the mechanism unit 42 to pivot with respect to the chassis 40. These axles 431, 432 are inserted into respective axle holes 433, 434 formed in the opposite inner wall portions of the chassis 40 defining the opening 41. By supporting the rear portion of the mechanism unit 42 with the axles 431, 432 in this way, the front portion of the mechanism unit 42 is able to move with respect to the chassis 40 between the lowered position shown in FIG. 2 and the raised position shown in FIG. 3 when the mechanism unit 42 (base frame 43) is rotated around the axles 431, 432.

Figure 6:
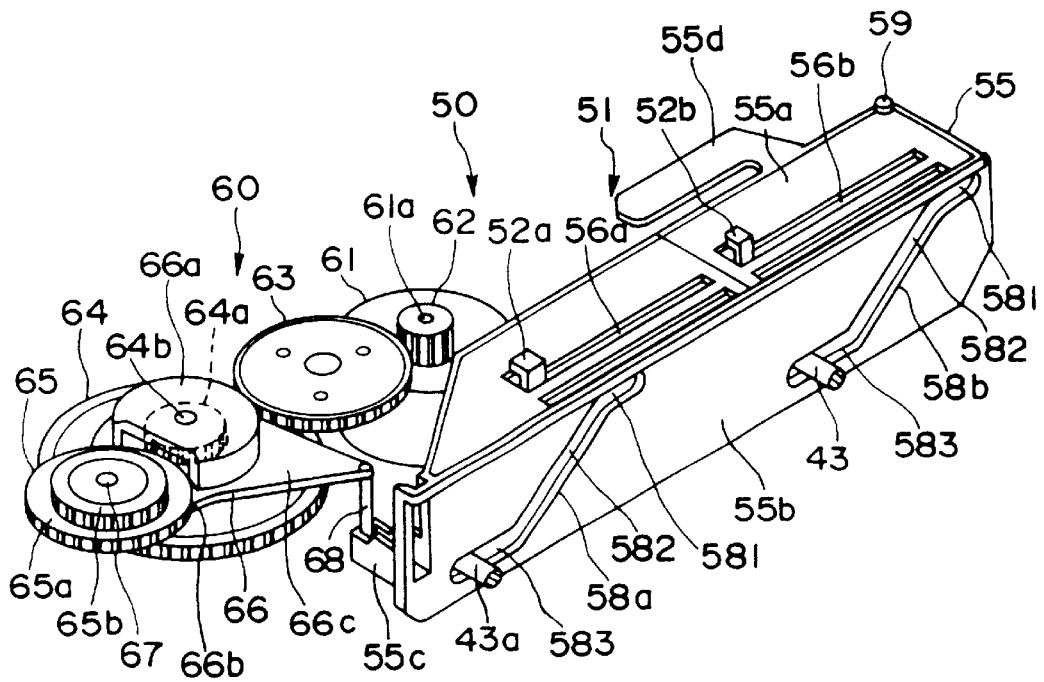
FIG. 6 is a perspective view which shows the structure of a cam mechanism used in the disc drive shown in FIG. 1, in which the cam member is shown in a first position.
Figure 7:
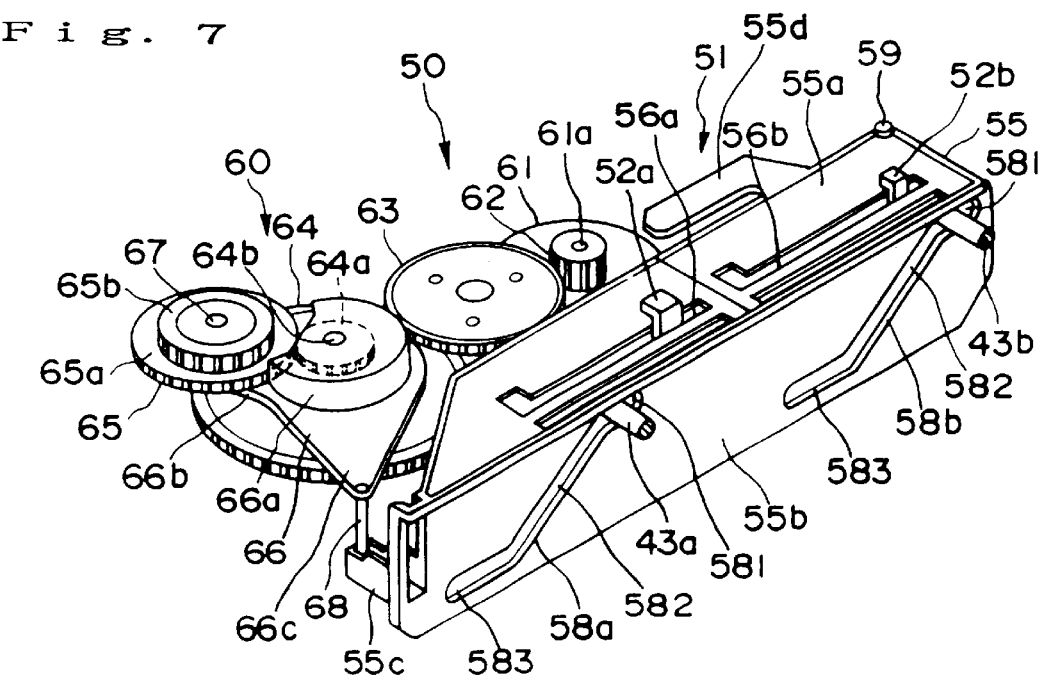
FIG. 7 is a perspective view which shows the structure of the cam mechanism used in the disc drive shown in FIG. 1, in which the cam member is shown in a second position.

Further, a pair of protruding guide pins 430a, 430b are formed on the front of the base frame 43 (See FIGS. 6 and 7). These guide pins 430a, 430b pass through respectively a pair of guide slots (not shown in the drawings) formed in the wall portion of the front portion of the chassis 40 which defines the opening 41 of the chassis 40, and then engage respectively with cam grooves 58a, 58b of the cam member 55 of the cam mechanism 51 described hereinbelow. This enables the front portion of the base frame 43 to be guided up or down in accordance with the displacement of the cam member 55.

Taking possible deformation (thermal deformation or the like) of the chassis 40 into account, a prescribed peripheral spacing 41G is provided between the base frame 43 and wall portions of the chassis 40. Specifically, this spacing 41G is provided around roughly the entire circumference of the base frame 43. In this way, the pivotal movement of the base frame 43 is not hindered even when the chassis 40 undergoes maximum distortion.

The support member 44 is constructed from a roughly rectangular-shaped bottom portion 44a and a wall portion 44b formed around the circumference of the bottom portion 44a. The wall portion 44b is one size smaller than the inner frame 43b of the base frame 43 such that the wall portion 44b is arranged inside the inner frame 43b of the base frame 43 via a prescribed spacing 43G. The support member 44 is supported by the base frame 43 via the elastic members (insulators) 441 provided on tabs 43T formed at the left and right corner portions of the front side of the inner frame 43b of the base frame 43 and on a tab 43T at roughly the middle of the rear portion of the inner frame 43b of the base frame 43. Namely, the support member 44 is supported by the base frame 43 via the elastic members 441 provided at three points which roughly form an isosceles triangle.

Figure 8:
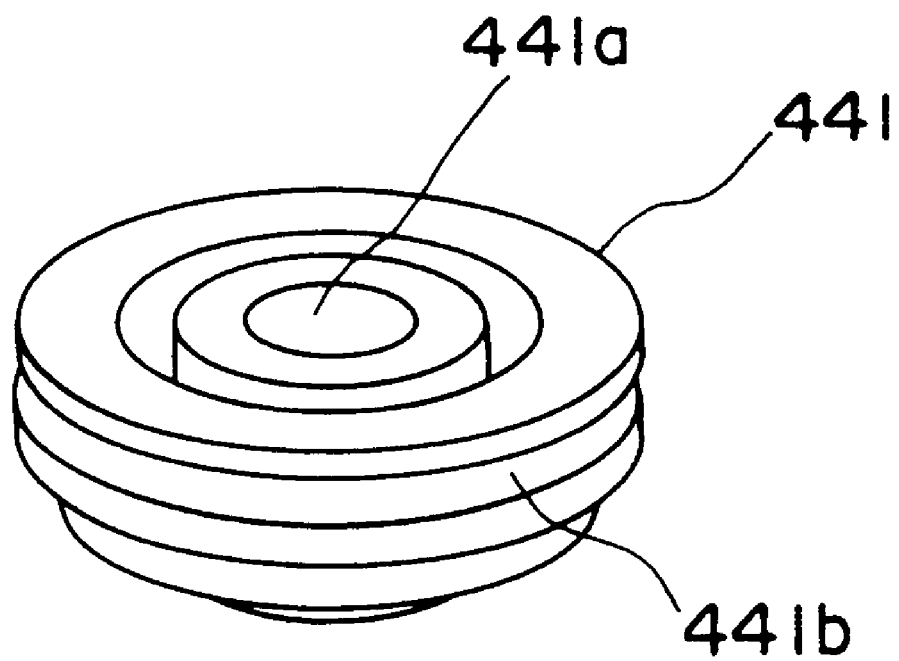
FIG. 8 is a perspective view showing the structure of an elastic member used in the disc drive shown in FIG. 1.

As shown in FIG. 8, each of the elastic members 441, which is formed from an elastic material such as rubber or the like, has a roughly cylindrical shape including a center hole 441a axially formed. On the outer circumferential surface, there is formed a circumferential groove 441b. When the elastic members 441 are arranged in place to support the support member 44 on the base frame 43, the center hole 441a of each elastic member 441 fits onto an axis provided on the respective tabs 43T of the base frame 43 and then the groove 441b fits over a respective notched portion formed at the corresponding position of the support member 44. This construction serves to prevent vibration that is generated by rotation of the spindle motor described hereinbelow from being transmitted to the chassis 40.

Further, as shown in FIGS. 2 and 3, the support member 44 is provided with a spindle motor (not shown in the drawings) for rotating an optical disc 3, a turntable 46 fixed to the rotation shaft 45a of the spindle motor, an optical pick-up 47, and an optical pick-up 47 moving mechanism 48 for moving the optical pick-up 47 in the radial direction of the optical disc 3.

The spindle motor is mounted to a motor support 45b which is made of a metal plate fixed to the support member 44. The spindle motor is capable of rotating the optical disc 3 at a high rotational speed, for example, capable of rotating the optical disc 3 at a speed of 180–3000 rpm.

The turntable 46 is a disc-shaped member which includes a protruding ring-shaped center hub 46a formed in the center portion of the turntable 46. This center hub 46a is adapted to fit into a center hole 3a of the optical disc 3. The center hub 46a is formed so as to taper from the tip to the base in order to prevent the optical disc 3 from slipping off center when placed on the turntable 46. Further, inside the center hub 46a, there is provided a spring (not shown) which allows the center hub 46a to be moved up and down. Furthermore, a ring-shaped permanent magnet 46b for creating an attraction force on a disc clamper 80 (described below) is provided in the turntable 46 at a position between the center hub 46a and the rotation shaft 45a of the spindle motor.

Further, a ring-shaped pad 46c is bonded to the upper part of the turntable 46 (i.e., the side used to support the optical disc 3) around the circumference of the center hub 46a. The pad 46c is made from an elastic material having a relatively high coefficient of friction so as to exhibit a function that prevents the optical disc 3 from slipping. Examples of such a material include various rubbers, soft resins or porous materials (sponges) or the like.

The optical pick-up 47 is a flat type optical pick-up constructed so as to deflect light reflected from the optical disc 3 by roughly 90 degrees using a mirror (or prism) or the like to guide such light toward a light gathering element such as a photodiode or the like.

As shown in FIGS. 2 and 3, the optical pick-up moving mechanism 48 is constructed from a DC motor (sled motor) 48a capable of forward/reverse rotation, a worm gear (lead screw) 48b which is fixed to the rotation shaft of the motor 48a, a worm wheel 48c which meshes with the lead screw 48b, a rack gear 48d which meshes with the small-diameter pinion gear (not shown in the drawings) which is integrally formed with the worm wheel 48c so as to be co-axially therewith, a slider 48e which is fixed to the rack gear 48d, a guide rod 48g which regulates the direction of movement of the slider 48e, and a head support (pick-up base) 48f which is integrally formed with the slider 48e, with the head support 48f being provided with the optical pick-up 47. Further, the lead screw 48b and the guide rod 48g are arranged so that their lengthwise directions are directed roughly parallel to the forward and backward direction of the disc drive 1.

In this type of optical pick-up moving mechanism 48, if the lead screw 48b is rotated in a prescribed direction by the motor 48a, this rotation is transmitted through the worm wheel and the rack gear to the slider 48e, and this force causes the slider 48e to move along the guide rod 48g in the forward-backward direction of the disc drive 1, whereby the optical pick-up 47 fixed to the head support 48f is moved in the radial direction of the optical disc 3 loaded on the disc tray 5.

In this embodiment, the spindle motor, the sled motor 48a and the loading motor 61 (described hereinafter in detail) are controlled by a controlling means (CPU) provided on the circuit substrate assembly (not shown in the drawings).

As shown in FIG. 2 and FIG. 3, in front of the mechanism unit 42, there is provided a loading mechanism 50 for displacing the mechanism unit 42 between the lowered position (FIG. 2) and the raised position (FIG. 3) and for moving the disc tray 5 between the loading position and the eject position. This loading mechanism 50 comprises a cam mechanism 51 which is operatively coupled with the mechanism unit 42 and can be moved between a first position (FIG. 2) and a second position (FIG. 3) and a driving mechanism 60 for driving the disc tray 5 and the com mechanism 51.

The cam mechanism 51 can be operated to move the mechanism unit 42 to either the lowered position when the cam mechanism 51 is in the first position shown in FIG. 2, or the raised position when the cam mechanism 51 is in the second position shown in FIG. 3.

In more details, as shown in FIGS. 6 and 7, the cam mechanism 51 includes a cam member 55 arranged so as to be slidable between a first position (FIG. 6) and a second position (FIG. 7) in the sideways direction with respect to the chassis 40 (i.e., the direction orthogonal to the direction of movement of the disc tray 5). The cam member 55 is generally constructed from a roughly plate-shaped horizontal portion 55a and a plate-shaped vertical portion 55b which is integrally formed on the underside surface the horizontal portion 55a at a position close to the rear edge (at the side of the mechanism unit) so as to be perpendicular to the horizontal portion. That is, the cam member 55 is formed from a member having a roughly T-shaped cross section. This structure can prevent camber from being produced upon cooling process in the injection molding of resin materials.

Formed on the horizontal portion 55a of the cam member 55 are sideways guide grooves 56a, 56b which engage respectively with a pair of protrusions 52a, 52b which protrude from the top of the front portion of the chassis 40. These guide grooves 56a, 56b are used to guide the cam member 55 between the first and second positions. Further, the underside surface of the horizontal portion 55a is provided with an engaging pin (not shown in the drawings) which is inserted into an elongated slot formed in the top of the front portion of the chassis 40. This engaging pin is adapted to interlock with an emergency eject mechanism 90 (described below).

Further, on the horizontal portion 55a of the cam member 55, there is formed a disc tray locking portion 55d which is engaged with the rib 5c formed on the rear surface of the disc tray 5 when the cam member 55 is displaced from the first position to the second position to restrict the movement of the disc tray 5.

The vertical portion 55b of the cam member 55 is positioned to face the front wall which defines the opening 41 of the chassis 40. Formed in the vertical portion 55b are a pair of cam grooves 58a, 58b each having the same shape. Each of the cam grooves 58a, 58b is constructed from a horizontally extending upper groove 581 and lower groove 583 and a slanting groove 582 which connects the upper groove 581 and lower groove 583.

Further, the guide pins (following members) 430a, 430b which are provided on the front surface of the base frame 43 of the mechanism unit 42 as described above are inserted into the cam grooves 58a, 58b, respectively. In this way, when the cam member 55 is moved between the first position and the second position, the guide pins 430a, 430b are slidably moved along the cam grooves 58a, 58b in the up and down direction.

Namely, when the cam member 55 is positioned at the first position, the guide pins 430a, 430b are engaged with the lower grooves 583 (FIG. 6), and the front portion of the mechanism unit 42 is in the lowered position shown in FIG. 2. When the cam member 55 is moved from the first position to the second position, the guide pins 430a, 430b are moved up by the slanting grooves 582, thereby causing the front portion of the mechanism unit 42 to move from the lowered position toward the raised position. Then, when the cam member 55 reaches the second position, the guide pins 430a, 430b engage with the upper grooves 581 (FIG. 7), and the front portion of the mechanism unit 42 is displaced to the raised position shown in FIG. 3. In this connection, it is to be noted that when the cam member 55 is displaced to the second position, the disc tray locking portion 55d formed on the horizontal portion 55a of the cam member 55 is engaged with the rib 5c formed on the underside surface of the disc tray 5 as described above, thereby the disc tray 5 is restricted to move further, that is the disc tray 5 being locked up.

Further, a protrusion 59 is integrally formed on an end portion of the horizontal portion 55a of the cam member 55 to engage with the cam member movement restricting groove 7 formed in the underside surface of the disc tray 5. As a result, when the protrusion 59 is engaged with the first movement restricting groove 7a of the disc tray 5, the cam member 55 is prevented from moving in the sideways direction, whereby the cam member 55 is held at the first position. Then, in accordance with the movement of the disc tray 5 toward the playback position, the protrusion 59 slides from the first movement restricting groove 7a to the second movement restricting groove 7b, and upon moving through the slanting groove of the second movement restricting groove 7b, the cam member 55 is caused to displace within the range of the lower grooves 583 of the cam grooves 58a, 58b of the cam member 55. Then, when the protrusion 59 reaches the position of the third movement restricting groove 7c, the cam member 55 is allowed to move toward the second position.

As shown in FIG. 6 and FIG. 7, the drive mechanism 60 of the loading mechanism 50 comprises a loading motor (DC motor) 61 capable or forward/reverse rotation provided on the underside surface of the front portion of the chassis 40, a pinion gear 62 mounted on a rotation axis 61a of the loading motor 61, a medium-diameter second gear 63 which meshes with the pinion gear 62, and a large-diameter third gear 64 which meshes with a small gear (not shown in the drawings) fixed coaxially below the second gear 63. Further, a small-diameter cylindrical portion is integrally formed on top of the third gear 64 so as to be coaxial therewith, with a small gear 64a being integrally formed on top of this cylindrical portion so as to be coaxially therewith. Meshing with the small gear 64a of the third gear 64 is an operative gear 65 which also meshes with the first and second racks 6a, 6b of the disc tray 5. Namely, the operative gear 65 is constructed from a lower gear 65a which meshes with the small gear 64a of the third gear 64, and an upper gear 65b which meshes with the rack 6 of the disc tray 5, in which the upper gear 65b being integrally formed on the same axis as the lower gear 65a.

In this embodiment, the gears 62–65 are flat teeth gears, and a combination thereof constitutes a rotational speed reduction mechanism for the loading motor 61 in the loading mechanism 50.

The operative gear 65 is rotatablly mounted to a rotation axis 67 provided on a planetary arm 66, and this planetary arm 66 is rotatably mounted to a rotation axis 64b of the third gear 64. The planetary arm 66 includes a rotation portion 66a which is rotatably fitted onto the cylindrical portion of the third gear 64, and first and second arms 66b, 66c which extend from the rotation portion 66a, so that the whole of the planetary arm 66 has a roughly v-shaped structure.

One end of the first arm 66b of the planetary arm 66 is provided with the protruding rotation axis 67 described above to which the operative gear 65 is rotatably mounted. Namely, the operative gear 65 rotates about the axis 67 of the first arm 66b which is served as a rotation axis thereof while the operative gear 65 also turns around the axis 64b which is served as a revolution axis, so that the operative gear 65 functions as a planetary gear which can be turned around the axis 64b along the second rack 6b with being rotated about the axis 67. In this planetary gear mechanism, the operative gear 65 acts as a planet gear and the small gear 64a of the third gear 64 acts as a sun gear. Further, the end of the second arm 66c of the planetary arm 66 is provided with a pin 68 which protrudes downward, and the tip portion of this pin 68 is fitted into an engaging portion 55c formed in the cam member 55.

In this connection, as shown in FIG. 6 and FIG. 7, one part of the rotation portion 66a of the planetary arm 66 is partially cut away to expose the small gear 64a of the third gear 64 in order to enable the lower gear 65a of the operative gear 65 to mesh with the small gear 64a of the third gear 64.

In this structure, the operative gear 65 carries out a first operation when engaged with the first rack 6a of the disc tray 5, in which the disc tray 5 is moved between the disc eject position and the disc loaded position with the operative gear 65 being held at a prescribed position, and a second operation when engaged with the second rack 6b of the disc tray 5, in which the cam member 55 is moved between the first position and the second position by the movement of the operative gear 65.

Specifically, while the protrusion 59 provided on the top of the horizontal portion 55a of the cam member 55 is in engagement with the first movement restricting groove 7a in the underside surface of the disc tray 5, the movement of the cam member 55 from the first position to the second position is restricted. Accordingly, during such time, in other words during the time that the disc tray 5 is moving between the eject position and the loaded position, the pin 68 of the second arm 66c of the planetary arm 66 is engaged with the engagement portion 55c of the cam member 55, thereby making it impossible for the planetary arm 66 to be turned around the axis 64b. As a result, the operative gear 65 is being held at a prescribed position while the protrusion 59 of the cam member 55 is engaged with the first movement restricting groove 7a of the disc tray 5. In this state, as shown by the dashed line in FIG. 2, the operative gear 65 engages with the first linear rack 6a of the disc tray 5, whereby the disc tray 5 is moved from the disc eject position to the disc loaded position according to the rotation of the operative gear 65 caused by the rotation of the loading motor 61, and in this way the operative gear 65 functions as a driving gear for moving the disc tray 5.

On the other hand, when the disc tray 5 moves accordingly to a position just before the disc loaded position, the protrusion 59 of the cam member 55 moves from the first movement restricting groove 7a to the second movement restricting groove 7b of the disc tray 5, and this causes the cam member 55 to be displaced by a small amount. When the disc tray 5 moves further, the protrusion 59 reaches the third movement restricting groove 7c, whereby the cam member 55 is allowed to move from the first position to the second position. In this state, as shown by the dashed line in FIG. 3, since the operative gear 65 is engaged with the arc-shaped second rack 6b and the cam member 55 is able to move to the second position and therefore the planetary arm 66 can be turned around the axis 64b, the operative gear 65 moves along the arc-shaped second rack 6b in accordance with the rotation of the loading motor 61. Namely, the operative gear 65 acts as a planetary gear.

In accordance with such a turning movement of the operative gear 65, the planetary arm 66 rotates clockwise around the common axis (revolution axis) 64b from the position shown in FIG. 6 to the position shown in FIG. 7, which in turn causes the second arm 66c of the planetary arm 66 to rotate in the same direction. In accordance with this rotation of the second arm 66c, the cam member 55 is driven by means of the pin 68 coupled with the engaging portion 55c, and thereby the cam member 55 moves from the first position shown in FIG. 6 toward the second position shown in FIG. 7. In accordance with this movement of the cam member 55 from the first position toward the second position, the front guide pins 430a, 430b of the base frame 43 of the mechanism unit 42 rise up along the slanting grooves 582, 582, whereby the front portion of the mechanism unit 42 is also displaced from the lowered position shown in FIG. 2 to the raised position shown in FIG. 3.

Figure 9:
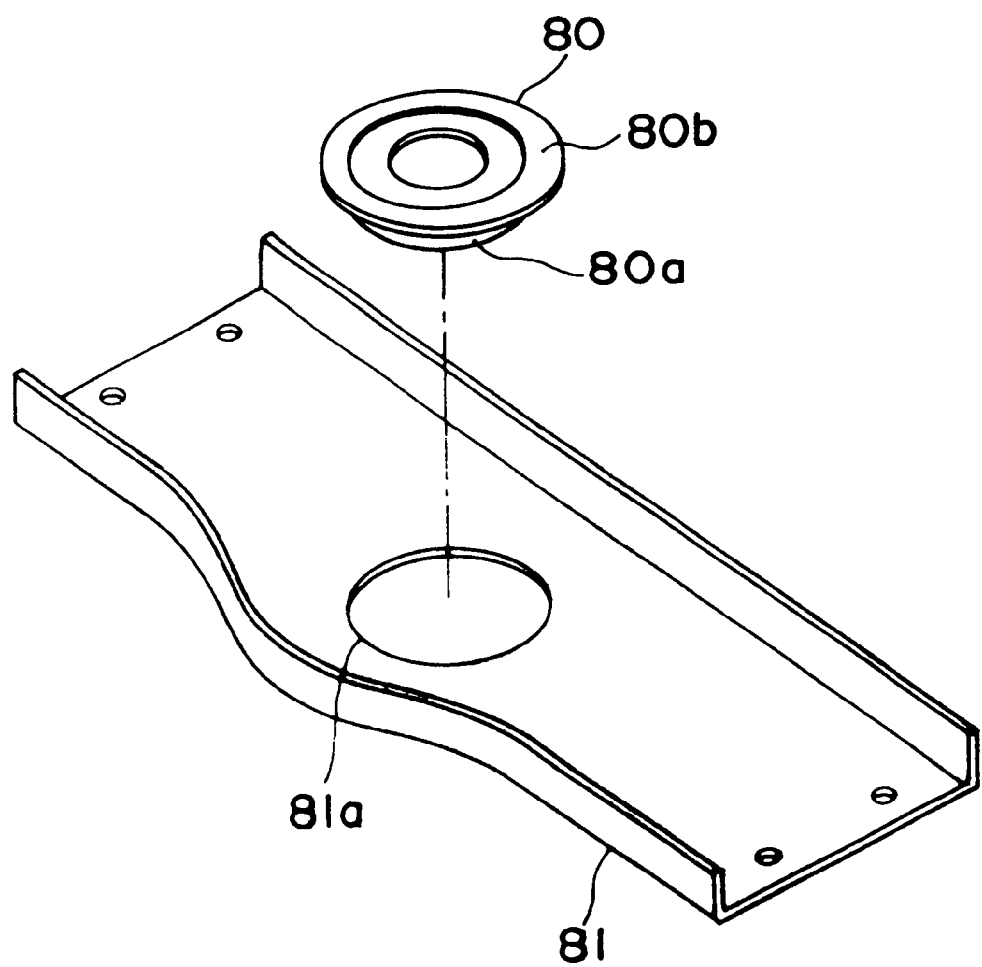
FIG. 9 is a perspective view which shows the structure of a disc clamper used in the disc drive shown in FIG. 1.
Figure 10:
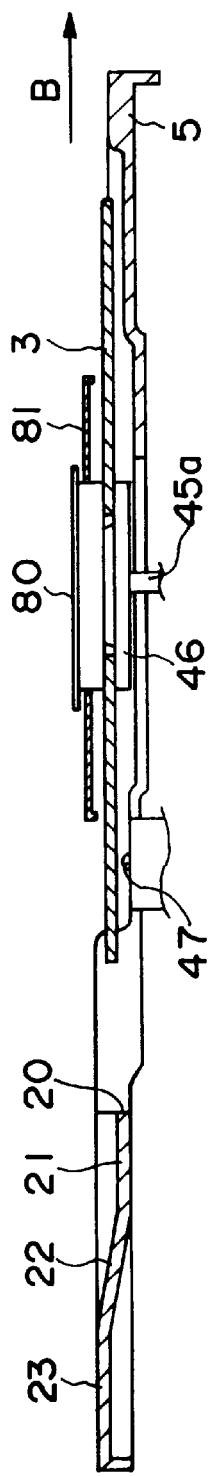
FIG. 10 is a cross-sectional view of the disc tray used in the disc drive shown in FIG. 1, which shows the state that the disc tray is in the disc playback position.

Further, a disc clamper 80 is provided on the upper portion of the chassis 40. As shown in FIG. 9, a plate-shaped support member 81 having a central opening 81a is mounted at a position above the turntable 46 so as to be bridged between the opposite side walls of the chassis 40, and the disc clamper 80 is rotatably supported by the support member 80 so as to be able to move in up and down direction.

In more detail, the support member 81 mounted onto the chassis 40 in the side-ways direction by being fastened at both ends with bosses (or rivets) to mounting portions 40c of the chassis 40. On the other hand, the disc clamper 80 is formed from a flat drum-shaped main body 80a having a bottom portion that is to be inserted into the opening 81a of the support member 81, and a flange portion 80b which is formed around the upper circumferential portion of the main body 80a. The flange portion 80b is adapted to abut the top of the support member 81. Further, an annular steel attraction member is provided inside the main body 80a and is adapted to be pulled by the permanent magnet 46b provided in the turntable 46.

Further, indicated by the reference numeral 90 in FIG. 2 and FIG. 3 is an emergency eject mechanism for the disc tray. This emergency eject mechanism is provided for ejecting an optical disc 3 placed on the disc tray in case the loading motor 61 is disabled to operate due to a power outage or the like when the optical disc 3 is being rotated for playback. Namely, in this emergency eject mechanism, a jig is inserted into the main body 2 from the outside to forcedly displace the cam member 55 from the second position to the first position to push out a tip portion of the disc tray 5 from the main body 2, and then the disc tray 5 is manually moved forward to eject the optical disc 3.

Next, in accordance with the above embodiment, a description of the operation of the disc drive will be given below. Now, if a loading operation is carried out by placing the optical disc 3 into the disc supporting portion 5a of the disc tray 5 which has been ejected to the outside through the opening 15a of the front panel 15 of the disc drive 1, the loading motor 61 will rotate in the described direction, thereby causing the operative gear 65 to rotate, via the rotational speed reduction mechanism, in the counterclockwise direction shown in FIG. 2. Accordingly, the disc tray 5 moves backward (toward the rear of the disc drive) through the opening 15a to the disc loaded position. In this way, the optical disc 3, which is supported at a prescribed position on the disc tray 5, is also transported to the disc loaded position (disc play back position) inside the main body 2.

During the loading operation of the disc tray 5, namely while the disc tray 5 is moving backward, the operative gear 65 engages with the first rack 6a on the underside surface of the disc tray 5, and the protrusion 59 of the cam member 55 is guided along the first movement restriction groove 7a. Accordingly, the cam member 55 is held at the first position, and is therefore unable to move to the second position. Consequently, the planetary arm 66 is held at a prescribed position so as to be unable to rotate. In this case, the operative gear 65 rotates at that position, so that it acts as a driving gear for driving the disc tray 5. Further, in this state, the front portion of the mechanism unit 42 is held at the lower position.

When the disc tray 5 approaches the disc loaded position, the protrusion 59 formed on the cam member 55 moves from the first movement restriction groove 7a to the second movement restriction groove 7b, thereby causing the cam member 55 to move slightly in the sideways direction. Then, when the disc tray 5 reaches the disc loaded position, the protrusion 59 of the cam member 55 has moved to the third movement restriction groove 7c via the second movement restriction groove 7b, thereby enabling the cam member 55 to move from the first position to the second position, which in turn also makes it possible for the planetary arm 66 to rotate.

In this state, the operative gear 65 moves from the first rack 6a to the second rack 6b.

In this state, the movement of the disc tray 5 is restricted while the planetary arm 66 is capable of revolution. Therefore, if the operative gear 65 is rotated by the loading motor 61, the operative gear 65 moves and turns along the arc-shaped second rack 6b around the axis 64b. Therefore, in this state, the operative gear 65 acts as a planetary gear.

When the operative gear 65 acts as a planetary gear and moves along the arc-shaped second rack 6b as described above, the planetary arm 66 also rotates in accordance with the movement of the operative gear 65, around the revolution axis (common axis) 64b in the clockwise direction shown in FIG. 2. When the planetary arm 66 rotates in this way, the second arm 66c of the planetary arm 66 also rotates in the same manner in the clockwise direction, thereby causing the cam member 55 to move from the first position to the second position.

In accordance with the movement of the cam member 55, the guide pins 430a, 430b of the front end of the base frame 43 of the mechanism unit 42 slide along the slanting grooves 582 of the cam grooves 58a, 58b and move upward to the upper grooves 581. Accordingly, the mechanism unit 42 is displaced from the lowered position to the raised position, whereby the center hub 46a of the turntable 46 fits into the central hole 3a of the optical disc 3 placed on the disc tray 5 and has been transported to the disc loaded position. Then, the disc clamper 80 is pulled by the pulling force of the permanent magnet of the turntable 46, and then the optical disc 3 is clamped between the turntable 46 and the disc clamper 80.

In this state, if an operation such as a playback operation is carried out, the spindle motor is operated to rotate the turntable 46 in prescribed speeds, thereby making it possible to playback the optical disc 3 or record information thereto.

In the case where the optical disc is to be removed after playback of the optical disc 3 is finished or stopped, optical disc 3 unloading (ejection) is carried out by operating a prescribed switch or the like. When such unloading is performed, the operations described above are carried out in reverse order.

Next, with reference to FIGS. 10 through 12A~12D, the positional relationship between disc tray 5 and the disc clamper 80 during the movement of the disc tray 5, in particular during the unloading operation thereof will be given below.

If a prescribed eject operation is carried out with the disc tray 5 existing at the disc playback position (FIG. 10), the mechanism unit 42 is displaced from the raised position to the lowered position, and in accordance with such displacement the turntable 46 is lowered, thereby the clamping of the optical disc 3 by the disc clamper 80 and the turntable 46 is released. As a result, the disc clamper 80 is horizontally supported by the support member 81 (FIG. 12A), and the optical disc 3 is placed on the disc supporting portion 5a of the disc tray 5. Then, the disc tray 5 begins to move toward the front of the main body 2 (B direction in FIG. 10).

Figure 12A:
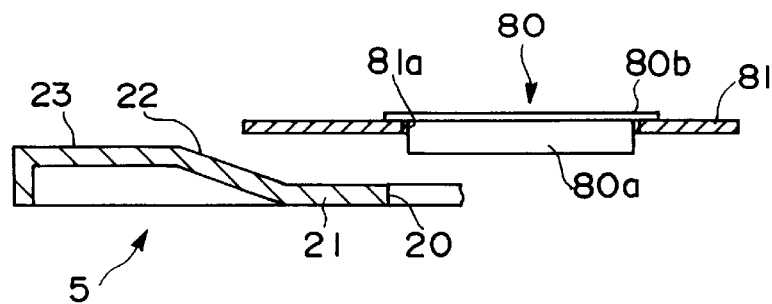
Figure 12B:
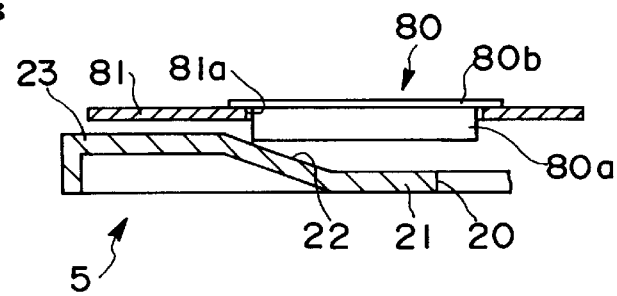

As the disc tray 5 moves toward the front of the main body 2, the concave portion 21 of the disc tray 5 passes below the disc clamper 80, and the inclined surface 22 comes into contact with the bottom end of the main body portion 80a of the disc clamper 80 (FIG. 12B).

Figure 12C:
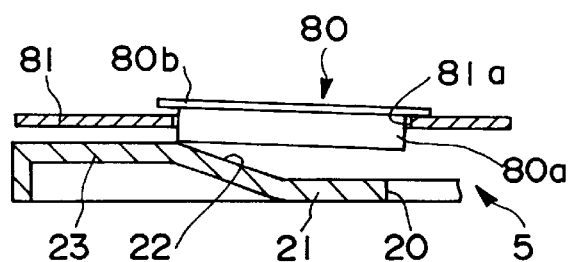

Then, as the disc tray 5 continues to move toward the front of the main body 2, the inclined surface 22 pushes the disc clamper 80 upward. Namely, the rear end of the disc clamper 80 is displaced upward along the inclined surface 22, whereby the rear end of the flange portion 80b is separated from the support member 81 (FIG. 12C).

Figure 11:
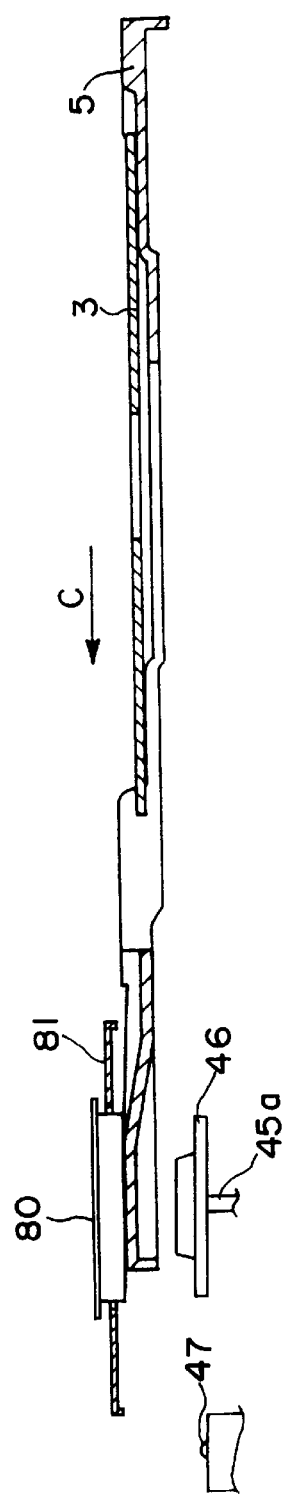
FIG. 11 is a cross-sectional view of the disc tray used in the disc drive shown in FIG. 1, which shows the state that the disc tray is in the disc eject position.
Figure 12D:
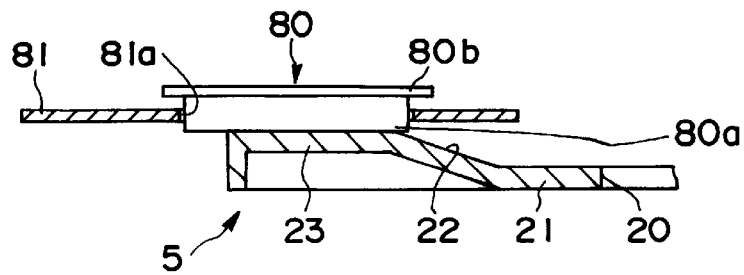
Figure 13:
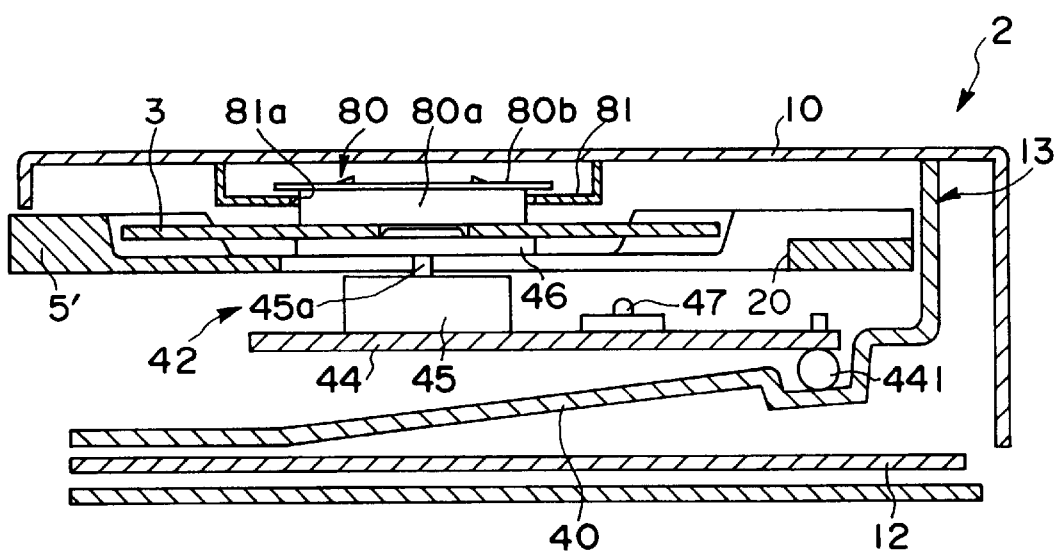
FIG. 13 is a cross-sectional view of the prior art disc drive, which shows the state where the disc tray is in the disc playback position.
Figure 14:
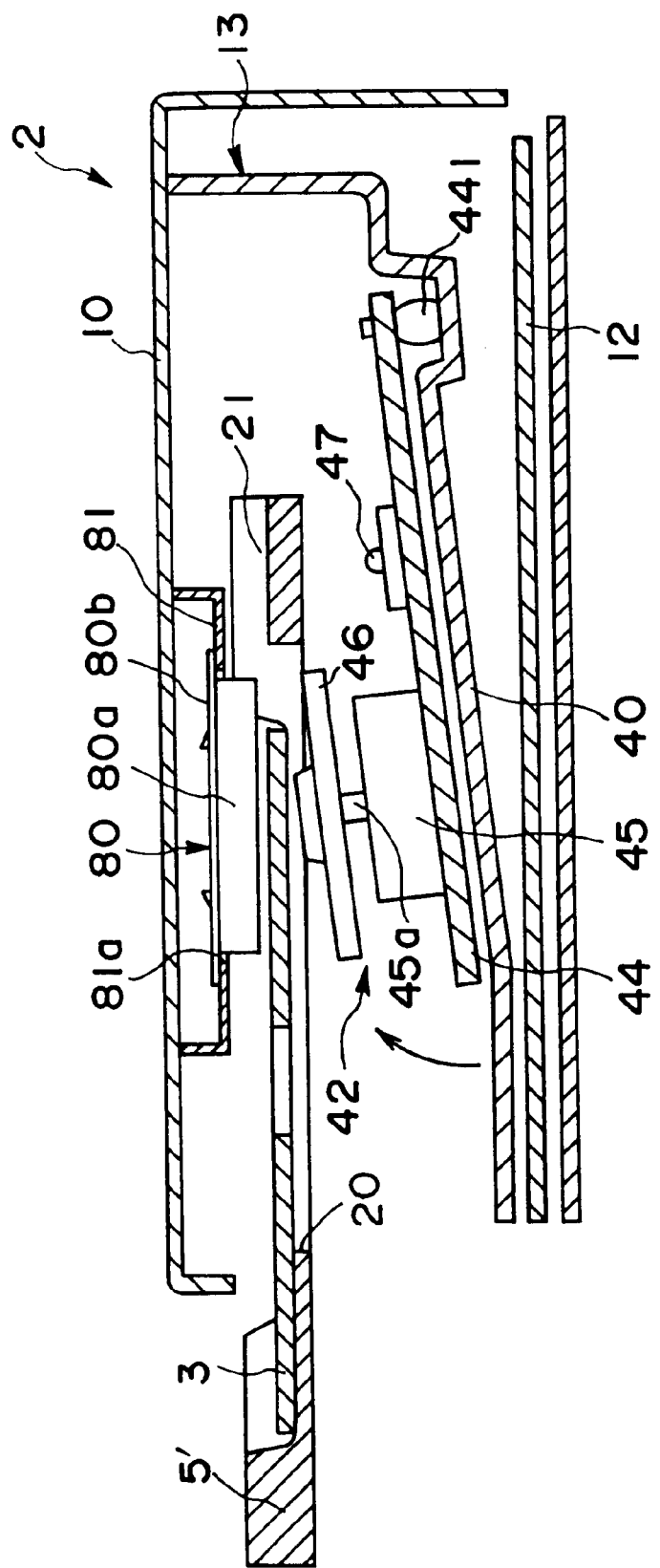
FIG. 14 is a cross-sectional view of the prior art disc drive, which shows the state where the disc tray is in the disc eject position.
Figure 15:
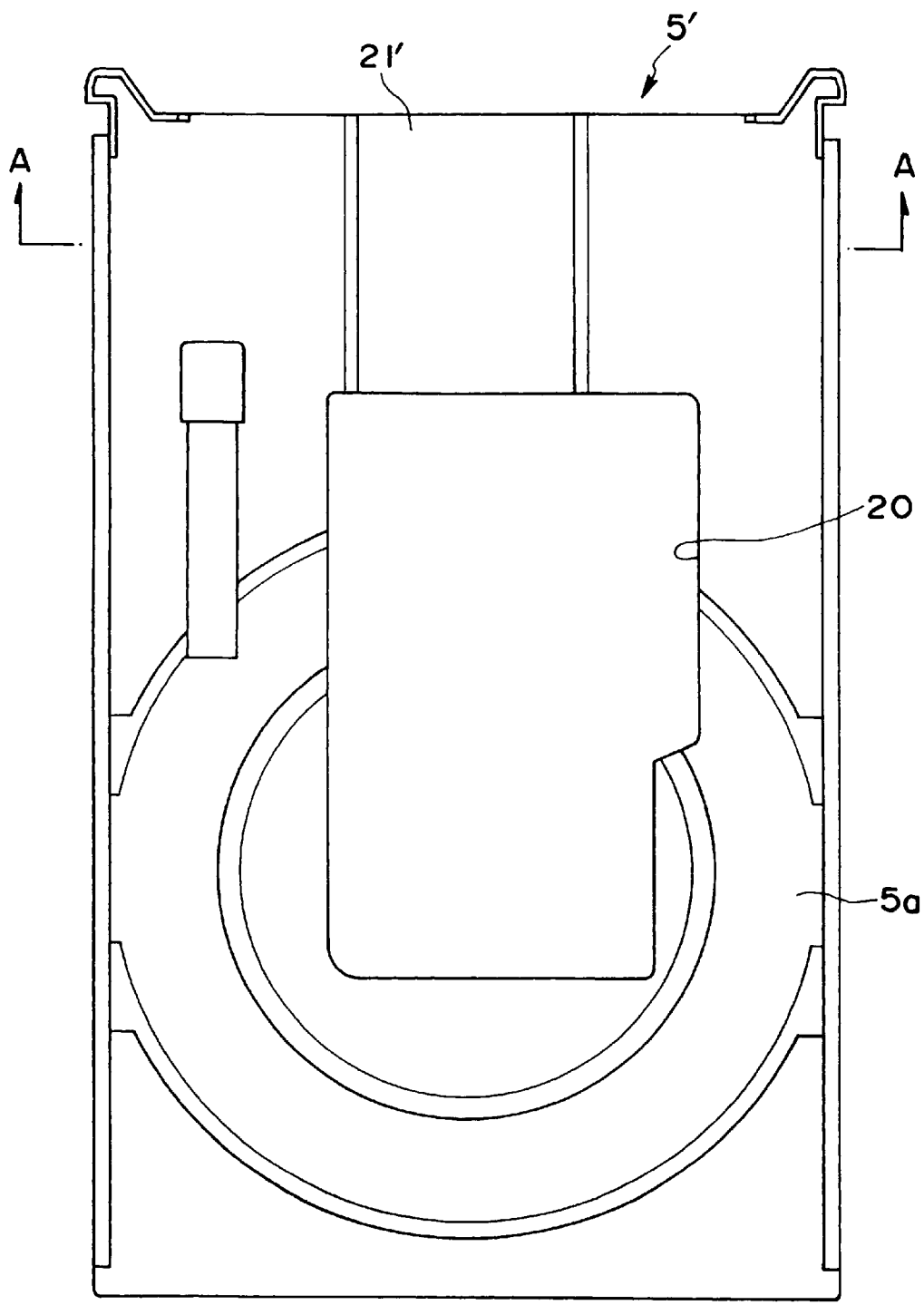
FIG. 15 is a top plan view of the disc tray provided in the prior art disc drive.
Figure 16:
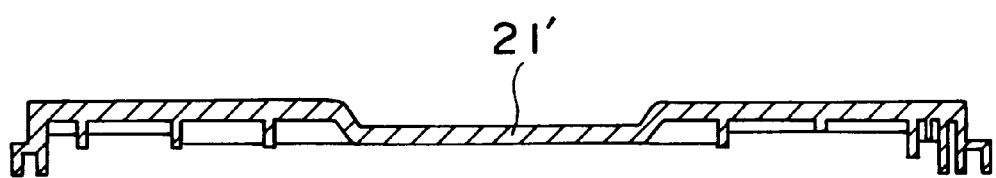
FIG. 16 is a cross-sectional view of the disc tray shown in FIG. 15 taken along line A—A.

Then, the disc tray 5 is further moved with pushing up the disc clamper 80, and when the disc tray 5 reaches the eject position, the rear portion of the disc clamper 80 runs over the top of the reinforcing portion 23 of the disc tray 5 (FIGS. 11, 12D).

In this way, in accordance with the above embodiment, by providing the disc tray 5 with a disc clamper displacement means (i.e., the inclined surface 22), it is possible to prevent the disc clamper 80 from obstructing the movement of the disc tray 5 during a disc unloading (ejecting) operation.

On the other hand, when a prescribed loading operation is carried out with the disc tray 5 at the disc eject position (FIGS. 11, 12D), the disc tray 5 is moved toward the rear of the main body 2 (the C direction in FIG. 11). In accordance with such movement of the disc tray 5, the disc clamper 80 is displaced downward along the inclined surface 22 (FIG. 12C).

Then, as the disc tray 5 continues to move toward the rear of the main body 2, the disc clamper 80 becomes horizontally supported by the support member 81 (FIG. 12B). In this state, the inclined surface 22 of the disc tray 5 is separated from the disc clamper 80, and the concave portion 21 passes below the disc clamper 80. Accordingly, even during a loading operation, the disc clamper 80 is prevented from obstructing the movement of the disc tray 5.

Further, as was described above, by providing the disc tray 5 with the reinforcing portion 23 and the inclined surface 22, a space is created underneath the disc tray 5, and such a space is utilized to provide ribs 25, 26 underneath the reinforcing portion 23 and the inclined surface 22 of the disc tray 5. Accordingly, by providing the ribs 25, 26, it is possible to increase the strength of the disc tray 5 and prevent cambering or warpage of the disc tray 5.

Further, even though the disc tray in the above embodiment was reinforced by forming ribs on the underside of the reinforcing portion and the inclined surface of the disc tray, the present invention is not limited to such structure. Instead thereof, it is also possible to reinforce the disc tray for example by forming these portions so as to have a sufficient thickness to reinforce the disc tray without the provision of such ribs described above.

Further, even though the inclined surface 22 which forms the disc clamper displacement means was described in the above embodiment as having a straight line profile when viewed from a vertical cross section, the inclined surface 22 of the present invention is not limited to such structure. Namely, it is also possible to form the inclined surface with any vertical cross-sectional profile so long as it is possible to prevent obstruction of the movement of the disc tray 5. For example, the inclined surface 22 may be formed so as to have a curved vertical cross-sectional profile.

Furthermore, in the present invention, the disc clamper displacement means does not need to be provided with the concave portion 21, and in its place it is possible to have the entire portion from the rear end of the opening 20 to the reinforcing portion 23 form a slope.

Further, even in the modifications described above, because it is possible to reinforce the disc tray 5 by forming ribs in the underside of the inclined surface and the reinforcing portion, or in the underside of a sloped portion, it is possible to increase the strength of the disc tray 5 and prevent cambering or warpage of the disc tray 5.

Finally, in the above, the disc drive equipped with the disc tray according to the present invention was described with reference to the embodiments shown in the drawings. However, it is to be understood that many changes and additions may be made to the embodiments without departing from the scope and spirit of the invention as defined in the appended Claims.

What is claimed is:

1. A disc drive comprising:
   a main body equipped with a turntable for supporting a disc, the turntable being rotationally driven by a motor;
   a disc tray having a first end and a second end which includes a disc supporting portion for supporting the disc between the first end and the second end of the disc tray, the disc tray being provided so as to be movable with respect to the main body between a disc loaded position and a disc eject position wherein the first end of the disc tray is first protruded from the main body during a disc ejection operation;
   a disc clamper for holding the disc transported to the disc loaded position by the disc tray between the turntable and the disc clamper, the disc clamper being provided so as to be rotatable and movable in the up and down direction with respect to the turntable provided in the main body; and
   a disc clamper displacement means provided at the second end of the disc tray for displacing the disc clamper upward to prevent the disc clamper from obstructing the movement of the disc tray during the disc ejection operation, wherein the disc clamper displacement means comes into contact with the disc clamper to displace the disc clamper upward after the clamping of the disc by the disc clamper and the turntable has been released, wherein the first end and at least a portion of the disc supporting portion of the disc tray protrude from the main body prior to the disc clamper displacement means displacing the disc clamper upward.

2. The disc drive of claim 1, wherein the turntable is constructed so as to be capable of displacement between a raised position in which the disc supported by the turntable is clamped between the turntable and the disc clamper, and a lowered position below the raised position in which the turntable is separated from the disc clamper.

3. The disc drive of claim 1, wherein the disc clamper displacement means includes an inclined surface formed on at least a portion of the disc tray to the rear of the disc supporting portion to push up the disc clamper to displace the disc clamper in the upward direction when the disc tray is moved from the disc loaded position to the disc eject position.

4. The disc drive of claim 3, wherein the disc clamper displacement means further includes a reinforcing portion connected to the rear of the inclined surface, whereby at least one portion of the upwardly displaced disc clamper runs along the top of the reinforcing portion when the disc tray moves to the disc loading/unloading position.

5. The disc drive of claim 4, further comprising reinforcing ribs formed underneath the reinforcing portion or underneath the reinforcing portion and the inclined surface to reinforce the disc tray.

6. The disc drive of claim 1, wherein the disc clamper is supported by a support member provided above the turntable inside the main body.

7. A disc drive comprising:

a main body equipped with a turntable for supporting a disc when the disc is loaded into the disc drive, the turntable being rotationally driven by a motor;

an optical pick-up for playing back or recording and playing back the disc loaded into the disc drive;

a disc tray having a first end and a second end which includes an opening and a disc supporting portion for supporting the disc between the first end and the second end of the disc tray, the disc tray being provided so as to be movable with respect to the main body between a disc loaded position and a disc eject position, the optical pick-up being positioned below the opening when the disc tray is loaded into the main body wherein the first end of the disc tray is first protruded from the main body during a disc ejecting operation;

a disc clamper for holding the disc transported to the disc loaded position by the disc tray between the turntable and the disc clamper, the disc clamper being provided so as to be rotatable and movable in the up and down direction with respect to the turntable provided in the main body; and a disc clamper displacement means provided at the second end of the disc tray for displacing the disc clamper upward to prevent the disc clamper from obstructing the movement of the disc tray during the disc ejection operation, disc clamper displacement means including an inclined portion formed in the disc tray at a rear side of the opening of the disc tray, wherein the inclined portion comes into contact with the disc clamper to displace the disc clamper upward after the clamping of the disc by the disc clamper and the turntable has been released, wherein the first end and at least a portion of the disc supporting portion of the disc tray protrude from the main body prior to the disc clamper displacement means displacing the disc clamper upward.

* * * * *

UNITED STATES PATENT AND TRADEMARK OFFICE
CERTIFICATE OF CORRECTION

PATENT NO. : 6,256,278 B1
DATED : July 3, 2001
INVENTOR(S) : Furukawa et al.

It is certified that error appears in the above-identified patent and that said Letters Patent is hereby corrected as shown below:

Column 3,
Line 11, change "disc dirve" to read -- disc drive --

Column 4,
Line 50, change "FIG .12D" to read -- FIG. 12D --

Column 6,
Line 47, change "disk" to read -- disc --

Column 13,
Line 35, change "embodment" to read -- embodiment --

Signed and Sealed this

Thirtieth Day of September, 2003

JAMES E. ROGAN
*Director of the United States Patent and Trademark Office*